March 2, 1926.                                           1,575,378
F. R. MULLER
PROCESS OF MANUFACTURING MASTIC SHEET MATERIAL
Filed April 16, 1925
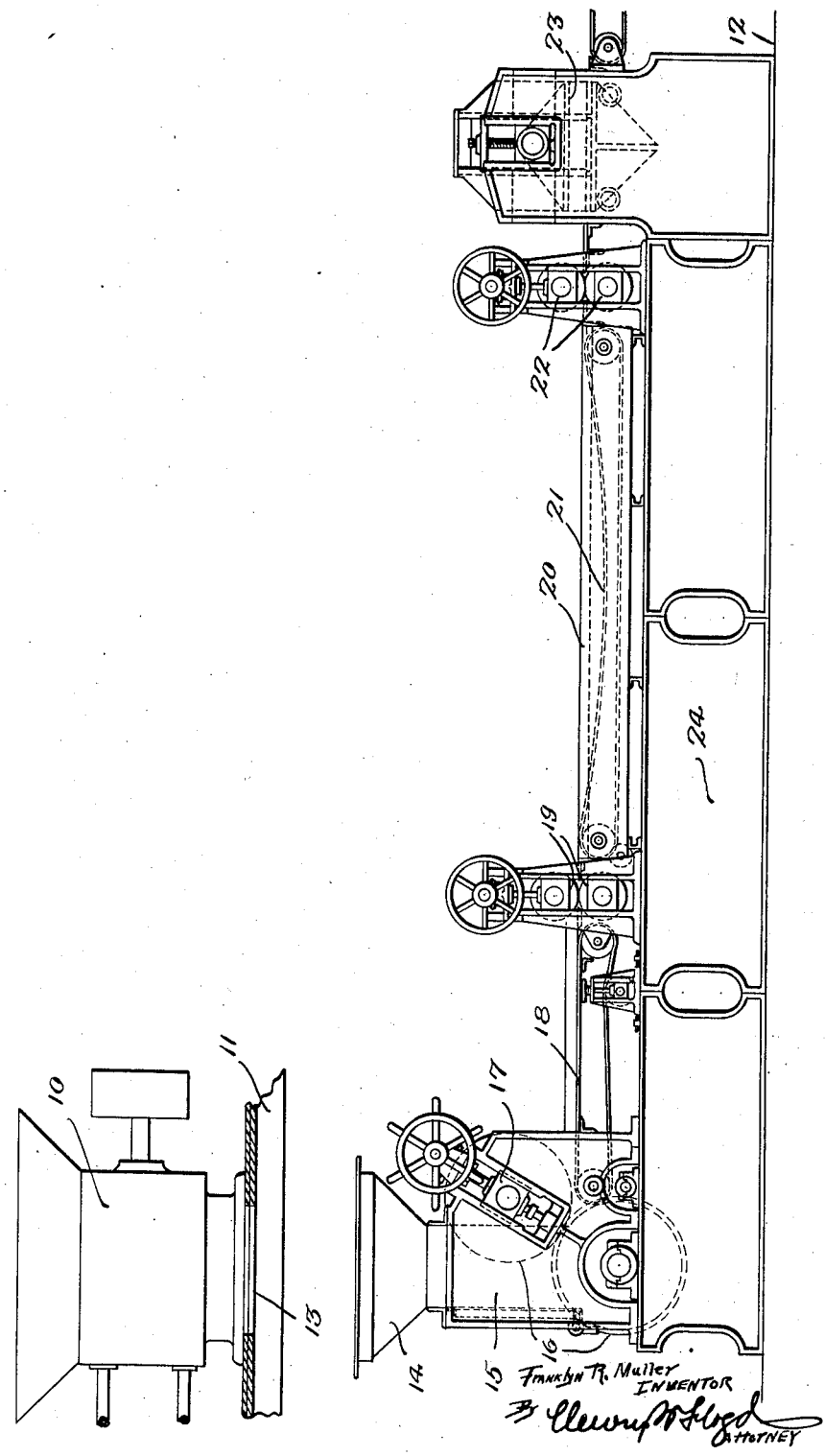

Patented Mar. 2, 1926.

1,575,378

UNITED STATES PATENT OFFICE.

FRANKLYN R. MULLER, OF LAKE BLUFF, ILLINOIS, ASSIGNOR TO FRANKLYN R. MULLER, INC., OF WAUKEGAN, ILLINOIS.

PROCESS OF MANUFACTURING MASTIC SHEET MATERIAL.

Application filed April 16, 1925. Serial No. 23,574.

*To all whom it may concern:*

Be it known that I, FRANKLYN R. MULLER, a citizen of the United States, residing at Lake Bluff, in the county of Lake and State of Illinois, have invented new and useful Improvements in Processes of Manufacturing Mastic Sheet Material, of which the following is a specification.

The present invention has to do with a mastic material adapted to be used as a tile, a shingle, a building material, and for other purposes, and relates particularly to the process or method of its manufacture.

It has been conventional, in the production of mastic tiles and other objects of sheet mastic, to employ calendering rolls, and the materials which are commingled for producing the sheets were first rendered plastic in small quantities and then repeatedly run through rolls of different thicknesses until, finally, a suitable sheet of material is secured. Manufacture on a production basis has been impossible in this crude manner, and the art has not been developed to any great extent.

The admixture of ingredients in the process just described has been wholly inadequate for the finished material has always been streaked and structurally weak. Rubber or other resinous material has been employed to cause the heterogeneous mixture of asphalt, gilsonite, silica, coloring material, and other ingredients to adhere more closely one to another when used in larger percentums and to add resiliency when used in small proportions by the addition of rubber has not solved the problem of manufacturing tiles, shingles, or other mastic sheet products.

A novel process for the production of sheet mastic material has been developed after extended experiment, and in conducting such experiments and in the development of this invention, the following objects have been borne in mind:—

A process for the production of mastic tiles and other mastic sheet material on a commercial basis;

An unique method for treating materials to produce a mastic sheet wherein the ingredients are completely and thoroughly mixed;

A process adapting to use the less expensive ingredients ordinarily employed in mastic sheet material manufacture for the purpose of reducing the material cost thereof;

A process of continuous manufacture of mastic sheets producing uniformity of product, a higher quality sheet, and reducing labor costs;

The adaptation of materials for mastic sheets to an improved method of manufacture eliminating a proportion of binders and allowing a higher percentum of filler material; and A wholly new process for producing mastic sheets introducing new steps or stages in the manufacture thereof whereby higher quality and greater uniformity are obtained, and the production may become a continuous process.

These objects, and such other objects as may hereinafter appear, are obtained by the novel steps employed in the process now to be described, and which is somewhat diagrammatically illustrated in the accompanying sheet of drawing in which Figure 1 is a schematic lay-out, in elevation, of machinery employed in carrying out the process herein described.

In a factory for the production of mastic sheets by the process comprising the invention, two floors are desirable. Stills for the reduction of asphalts and gilsonite to liquid form preferably are provided upon the upper floor. The liquefied product is pumped directly from the stills in steam jacketed pipes to mixers, preferably also on the same floor, and in such mixers commingled with fillers. The proportion of gilsonite, asphalts and fillers will be determined by the melting point of the finished product desired, gilsonite raising the fusion point of such product and giving greater hardness to the mass.

Mixers for the mass are of a mechanical type for the handling of heavy materials in large quantities and are also steam jacketed. The mixer (or mixers) empty into a chute delivering the plastic mass to a hopper leading to "forming" rolls carried in a press on the floor below, the rolls being adjustable to vary the thickness of material discharged therefrom.

The press is steam jacketed to permit of it being heated. The plastic material emptied into it is therefore kept from chilling before passing through the "forming" rolls. Each of the forming rolls is internally chambered to permit of water circulating adjacent its peripheral wall to cool or heat said wall as is required. The forming rolls are preferably obliquely disposed.

A conveyor belt conveys the sheet material to a set of squeeze rolls where the thickness of the sheet is reduced and its surface rendered more smooth. As in the case of the forming rolls, the squeeze rolls are adapted to be heated or chilled and are adjustable to provide various thicknesses of sheet material.

A second conveyor belt conveys the material from the first set of squeeze rolls to a second set, which are squeeze rolls but in this description will be called "finishing" rolls to distinguish them from the first set of squeeze rolls. The belt conveyor last mentioned is disposed in a pan and causes the sheet material to be immersed in the water or other material therein contained for a portion of its journey from the squeeze rolls to the finishing rolls. Hot or cold water may be supplied to the pan and the pan may be equipped with temperature maintaining or regulating devices.

Adjacent the finishing rolls there may be a cutting device. A member having a plurality of cutting edges, generally the outline of the object being manufactured, is arranged upon an eccentrically actuated carrier which is adapted to travel with the sheet material at the speed of such material during the entire cutting process. Said carrier lifts the cutters when the cutting is completed and returns them to cutting position. Adjacent the travelling cutter is a belt conveyor for carrying away the cut objects and the waste. The waste is usually collected and mixed with succeeding batches of ingredients. In actual production, there is no material waste whatever for the waste may be rendered plastic and used over again.

The several rolls and the travelling cutter may be disposed upon a suitable longitudinal frame, and all parts driven by a single prime mover. If this is done, each of the squeeze rolls should be geared at different speed so as to take up excess material which may gather upon the several conveyors. Each set of rolls being closer together causes the sheet material to collect at the receiving side unless each succeeding set of rolls has a slightly increased speed. It is better to provide each set of rolls with its own driving unit, the driving unit for the finishing rolls also actuating the travelling cutter. More sets of rolls may be employed where desired but the lay-out here has been found commercially practicable.

The typical lay-out just referred to and illustrated in the accompanying single sheet of drawing which is in elevation comprises, as is shown, a mixer 10 upon an upper floor 11, which is adapted to discharge mixed material into the apparatus disposed upon a lower floor 12, and indicated by extension lines. The stills for the reduction of the asphalts and gilsonite are independent apparatus and are not shown. The mixer 10 is of a steam jacketed variety.

The said mixer 10 discharges through floor 11 into a chute 13 which empties into a hopper 14 leading to a press 15 having forming rollers marked 16, which rolls 16 are adjustable. The instrumentalities for adjustment are clearly shown and marked 17.

A conveyor belt 18 advances the sheet material passing through the forming rollers 16 to squeeze rollers 19 from whence the sheet material is conveyed through water or other liquid, contained in a pan 20 by a second belt 21.

A set of finishing rollers 22 receives the material from the bath 20, and after such material has passed therethrough, it may be run through a cutting device, designated 23. An integral or sectional frame upon which the apparatus on the lower floor 12 is mounted, is designated by the numeral 24.

The process is carried out by mixing the necessary ingredients in the steam heated mechanical mixers. Waste from previous operations may be added thereto or used in producing a batch of plastic material. The material when thoroughly plastic—about like bread dough in its plasticity—is discharged into the hopper about the forming rolls. The hopper is heated by a steam jacket. The forming rolls are cooled (ordinarily) by water. Cold rolls absolutely prevent adhesion of the material thereto and give a chilled surface to the sheet which assists in the further steps of manufacture.

Sheet material passes from the forming rolls onto a conveyor belt and is conveyed to the squeeze rolls where the surface of the material is smoothed and the sheet further reduced in thickness. The material is still quite plastic under ordinary conditions when it passes through the squeeze rolls.

From the squeeze rolls, the sheet is carried upon a belt conveyor through a water bath to the finishing rolls. The water in the bath or pan may be warm to keep the material plastic but under abnormal conditions may be cool to reduce plasticity.

From the finishing rolls, the material is forced under a travelling cutter and there divided into the commercial article—a tile, a shingle, etc. The finished article is carried away upon a conveyor belt together with the waste, the former to be marketed and the latter to be returned to the mixer.

A continuous process of manufacture for mastic tile, shingles, etc. and other objects is disclosed. Batches of mastic may be made uniform for each ingredient, may be carefully measured or weighed and the resulting article of manufacture is also uniform. Adequate mixing is had and production can be speeded up to admit of commercial use.

By the use of an ancillary hopper in the "forming" rolls and of beaters comprising a shaft having thereon a plurality of variously shaped arms arranged transversely of said hopper, a veined or marbled effect in the finished sheet may be had. This, of course, necessitates the use of differently shaded mastics, beaten in different mixers and conveyed in proper proportion to the forming rollers and only partially admixed before pressing.

None of the deficiencies of the previously employed processes of mastic manufacture are present in the process here described for there is no necessity to mingle at calendering rolls small batches of material of different degrees of temperature. The difficulty of reheating, and the necessity to "cut" the material with gasoline, as has frequently heretofore been done, is avoided. A better product of cheaper ingredients results. A larger quantity of filler may be incorporated in the material. This increment increases its wearing qualities. Pigments may be completely and evenly distributed and the finished product possess a uniform color throughout, an impossibility heretofore.

In place of tile cutters, "slitters" may be employed when "lengths" of sheet material are desired. Slitters comprise circular rotating knives adapted to cut the material longitudinally of the course of its travel from the squeeze rollers. Ordinarily such rotating knives are opposed and arranged in gangs upon shafts, the space between knives determining the width of the mastic sheet. Such "lengths" are used as fillers for stair treads and for expansion strips in concrete roads.

I claim:—

1. A process of producing sheet mastic which includes heating and mixing the ingredients thereof, passing the plastic material thus produced through chilled forming rolls, squeeze rolls, and a water bath.

2. A process of producing sheet mastic suitable for cutting into tiles, shingles, etc., which includes the steps of mechanically mixing and heating the ingredients thereof to form plastic batches, successively depositing such batches in a heated container to be discharged therefrom between sheet forming rolls, and passing the sheet material thus formed successively and while plastic between squeeze rolls, a water bath, finishing rolls, and a cutter device.

3. A process of manufacturing sheet mastic material which comprises mechanically mixing and heating a mass of ingredients high in filler material and low in binder material, passing the plastic mass while still being heated through chilled sheet forming rolls, and subsequently passing the sheet thus formed through squeeze rolls, water, finishing rolls, and a cutting device.

4. The process of producing a mastic tile or the like which comprises mixing the ingredients in the presence of heat and while still being heated, forcing the mass through chilled sheet forming rolls, and subsequently passing the sheet thus formed and while still plastic successively through squeeze rolls, a bath of water, finishing rolls and a travelling cutter.

FRANKLYN R. MULLER.